United States Patent [19]
Delmas

[11] Patent Number: 5,892,553
[45] Date of Patent: Apr. 6, 1999

[54] SLOW MOTION IMAGE PROCESSING SYSTEM AND METHOD

[75] Inventor: Francis Delmas, Herblay, France

[73] Assignee: Thomson Broadcast Systems, Cergy Pontoise Cedex, France

[21] Appl. No.: 773,003

[22] Filed: Dec. 23, 1996

[30] Foreign Application Priority Data

Dec. 21, 1995 [FR] France .................................. 95 15294

[51] Int. Cl.⁶ .............................. H04N 9/74; H04N 9/64
[52] U.S. Cl. ......................... 348/578; 348/708; 348/722; 348/222
[58] Field of Search .................................... 348/222, 722, 348/234, 22, 23, 578, 571, 708; H04N 5/228, 9/74, 9/64

[56] References Cited

U.S. PATENT DOCUMENTS

| | | |
|---|---|---|
| 4,677,464 | 6/1987 | Yamaji et al. . |
| 4,785,358 | 11/1988 | Ninomiya . |
| 5,734,424 | 3/1998 | Sasaki .................................... 348/222 |

FOREIGN PATENT DOCUMENTS

| | | |
|---|---|---|
| A-0-420-612 A2 | 4/1991 | European Pat. Off. . |
| A-0-459-615 A2 | 12/1991 | European Pat. Off. . |
| A-60 007648 | 1/1985 | Japan . |
| A-06-125526 | 5/1994 | Japan . |

*Primary Examiner*—Sherrie Hsia
*Attorney, Agent, or Firm*—Oblon, Spivak, McClelland, Maier & Neustadt. P.C.

[57] ABSTRACT

A device for processing color data (R, G, B) of a signal representing an image. The processing device has a mechanism which, for each color data item, consist of an analog/digital converter (12, 13, 14) and a buffer memory (MT1, MT2, MT3), a circuit (PT) for processing the digital data output by each buffer memory, and serializer circuits (SE1, SE2, SE3) which collect the signals output by the processing circuit (PT) and make it possible to generate signals (D1, D2, D3) intended to reproduce the image with a slow-motion effect. According to an improvement of the invention, the control unit includes a mechanism (MO, SE4) for generating a signal (I) making it possible to reproduce the image at normal speed. The device applies particularly to television studio cameras in the professional sector.

8 Claims, 6 Drawing Sheets

SLOW MOTION IMAGE PROCESSING SYSTEM AND METHOD

FIELD OF THE INVENTION

1. Background of the Invention

The invention relates to an electronic slow-motion camera.

The invention applies more particularly to television studio cameras.

2. Discussion of the Background

Cameras of this type consist of a device making it possible to convert luminous data into colour electrical data (R, G, B) and of a device for processing these colour data (R, G, B).

According to a first embodiment of these cameras, the device making it possible to convert the luminous data into colour data (R, G, B) is located in a camera head, whereas the processing device is located in a control unit which is some distance away from the camera head and is connected to the camera head by a cable.

According to another embodiment, the device making it possible to convert the luminous data into colour data (R, G, B) and the processing device are located in the same entity, which constitutes the camera itself.

Two types of solutions are known to the person skilled in the art for creating slow motion.

A first solution consists in using a camera whose control unit operates at the standard frame frequency, that is to say 50 Hz or 60 Hz depending on the country, and in sending the signal output by the camera into a video tape recorder equipped with a slow-motion function.

A second solution consists in using a camera whose control unit operates at a frame frequency whose value is equal to an integer multiple of the standard frequency, for example 150 Hz or 180 Hz, and in sending the signal output by the camera into a video tape recorder designed to record at the operating frequency of the control unit and to read at the standard frequency, that is to say 50 Hz or 60 Hz respectively.

The solutions described above have numerous drawbacks. The systems employed for obtaining slow motion are heavy and bulky because of the large size of the video tape recorders. This drawback is even more disadvantageous when the control unit and the video tape recorder have to be placed in a vehicle, for example an outside broadcast van, in order to produce a mobile control room.

Furthermore, if it is desired to have not only images representing the scene in slow motion, but also images representing the scene in real time, then it is essential to use a second camera. This represents another drawback.

The invention does not have these drawbacks.

SUMMARY OF THE INVENTION

The invention provides a device for processing the colour data (R, G, B) of a signal representing an image. The processing device comprises means which, for each colour information item, consist of an analog/digital converter and of a buffer memory associated with the said analog/digital converter, the output of each analog/digital converter being connected to the input of the buffer memory which is associated with it, a processing circuit making it possible to process the digitized data output by each buffer memory, the said processing circuit comprising conversion circuits making it possible to convert the colour data (R, G, B) into luminance and chrominance data (Y, CR, CB), and serializer circuits which collect the signals output by the processing circuit and make it possible to generate signals intended to reconstruct the image with a slow-motion effect.

Each analog/digital converter makes it possible to sample the signal which it receives at a frequency Fe equal to N times the standard sampling frequency of the luminance signal. This gives: Fe=N×13.5 MHz. Each buffer memory makes it possible to write the samples which it receives at the frequency Fe and to read these same samples at the standard sampling frequency of the luminance signal.

Likewise, the invention provides a device for processing colour data (R, G, B) which is of the type mentioned above and comprises additional means for generating a signal making it possible to reproduce the image in real time, that is to say at normal speed.

One advantage of the invention is therefore that a single camera is produced which makes it possible simultaneously to deliver images of a given scene at normal speed as well as data making it possible to generate slow-motion images of the same scene.

When the camera consists of a camera head and of a control unit, the processing device according to the invention may be located either in the camera head or in the control unit.

When the camera is an integral entity, the processing device according to the invention forms part of the processing device of this entity.

Thus, in general, the invention provides a camera comprising a device making it possible to convert the luminous data into colour data (R, G, B) and a device for processing the colour data (R, G, B), characterized in that the device for processing colour data (R, G, B) comprises means which, for each colour information item, consist of an analog/digital converter and of a buffer memory associated with the said analog/digital converter, the output of each analog/digital converter being connected to the input of the buffer memory which is associated with it, a processing circuit making it possible to process the digitized data output by each buffer memory, the said processing circuit comprising conversion circuits making it possible to convert the colour data (R, G, B) into luminance and chrominance data (Y, CR, CB), and serializer circuits which collect the signals output by the processing circuit and make it possible to generate signals intended to reconstruct the image with a slow-motion effect.

As mentioned above, each analog/digital converter makes it possible to sample the signal which it receives at a frequency Fe equal to N times the standard sampling frequency of the luminance signal. This gives: Fe=N×13.5 MHz. Each buffer memory makes it possible to write the samples which it receives at the frequency Fe and to read these same samples at the standard sampling frequency of the luminance signal.

The invention also provides a lightweight and compact novel system making it possible simultaneously to deliver a slow-motion image and a normal-speed image of the same scene by using a single camera as mentioned above.

DESCRIPTION OF THE DRAWINGS

Other characteristics and advantages of the invention will emerge from reading a preferred embodiment, taken by way of non-limiting example and given with reference to the appended figures, in which.

DESCRIPTION OF THE PREFERRED EMBODIMENTS

Throughout the Figures, the same references denote the same elements.

Figure 1A:
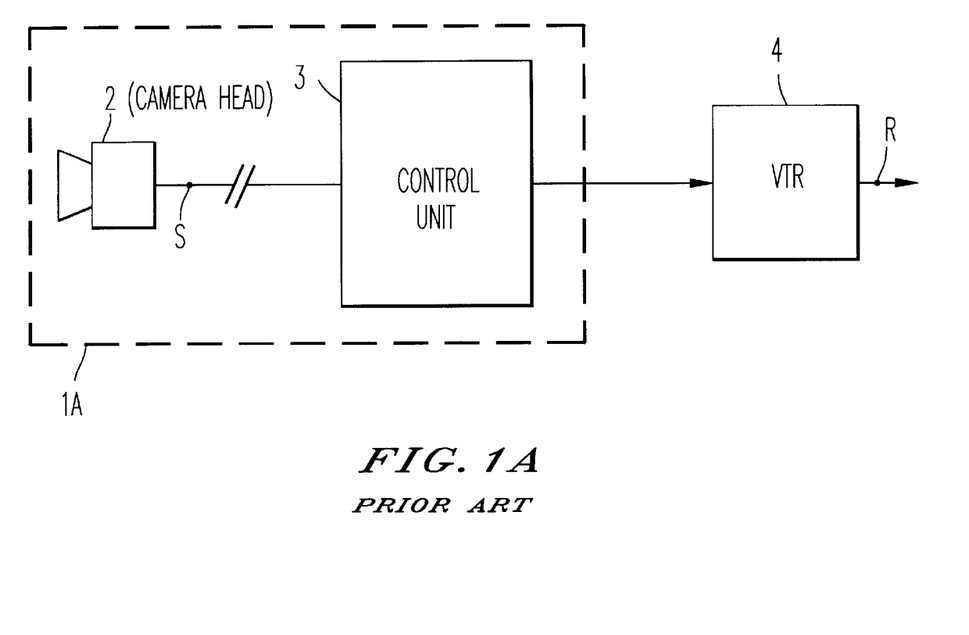
FIGS. 1a and 1b represent the two embodiments making it possible to create slow motion according to the prior art.
Figure 1B:
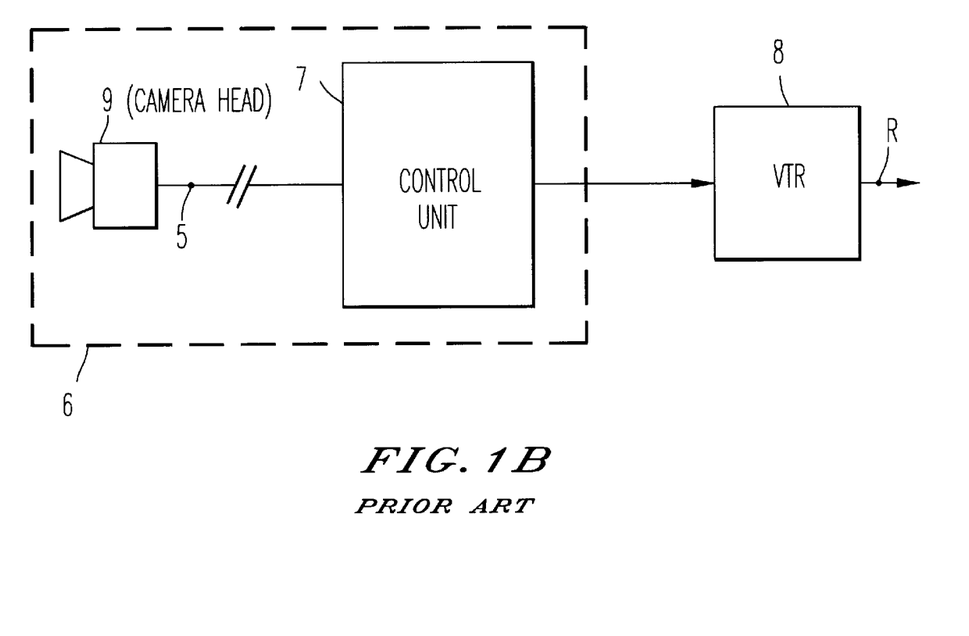

FIGS. 1a and 1b represent the two embodiments making it possible to create slow motion according to the prior art.

The device of FIG. 1a is composed of a camera 1 and a video tape recorder 4. The camera 1 is itself composed of a camera head 2, a control unit 3 and a cable 5 connecting the camera head to the control unit. The slow motion R is output by the video tape recorder 4.

According to this first embodiment of the prior art, the camera head and the control unit operate at the standard frame frequency, that is to say 50 Hz or 60 Hz. The video tape recorder 4 is also a standard video tape recorder whose particular feature is that it has a slow-motion function.

The device in FIG. 1b is composed of a camera 6 and a video tape recorder 8. The camera 6 consists of a camera head 9 and a control unit 7 which are connected together by a cable 5. The camera 6 is composed of a head 9 making it possible to analyse the images so as to form frames whose frequency is equal to an integer multiple of the standard 50 Hz or 60 Hz frequency, that is to say, for example, 150 Hz or 180 Hz. The control unit 7 then operates at the frequency 150 Hz or 180 Hz.

The video tape recorder 8 is designed to record at the operating frequency of the control unit 7 and to read at the standard frequency so as to reproduce the slow motion R.

Figure 2:
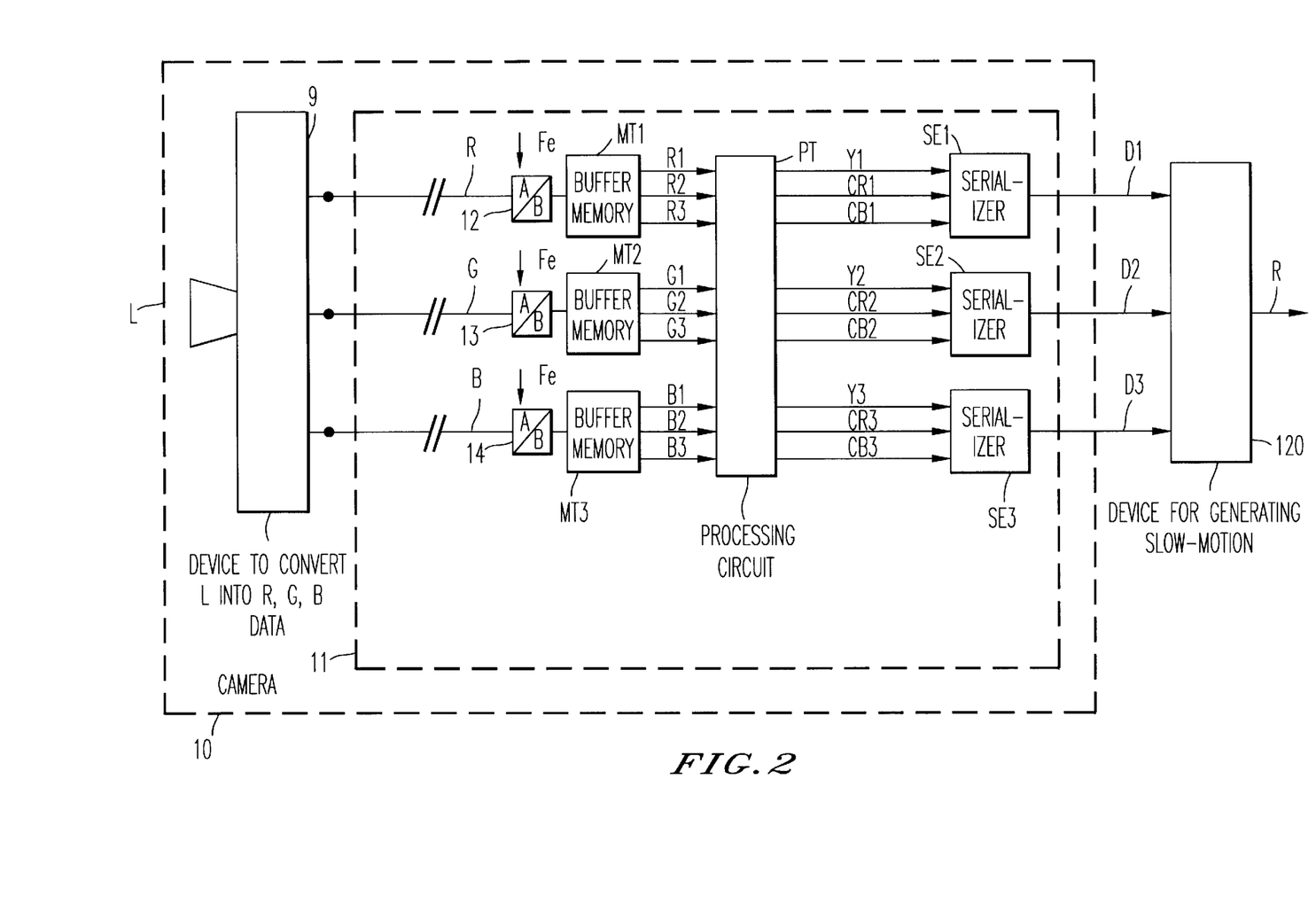
FIG. 2 represents the block diagram of the embodiment making it possible to obtain slow motion according to the invention.

FIG. 2 represents the block diagram of the embodiment making it possible to obtain slow motion according to the invention.

The camera 10 consists of a device 9 making it possible to convert the luminous data L into colour data (R, G, B) and another device 11, the components of which will later be described herein. The device 9 comprises means making it possible to analyse the images so as to form high-frequency frames, that is to say frames whose frequency is equal to an integer multiple N of the standard 50 Hz or 60 Hz frequency.

For the embodiment described in FIG. 2, the integer N is equal to 3. However, the invention relates to other integer values of N such as, for example, N=2.

Each colour data item (R, G, B) is connected to the input of an analog/digital converter (12, 13, 14) with sampling frequency Fe. In the context of the 601 standard, the reading frequency of the samples output by the buffer memories is equal to 13.5 MHz and the sampling frequency Fe is equal to N×13.5 MHz. When, for example, N=3, this gives Fe=40.5 MHz.

Each colour data item (R, G, B) is subjected to a sequence of identical processing stages, represented in FIG. 2 by the succession of circuits, namely: the analog/digital converters (12, 13, 14) mentioned above, buffer memories (MT1, MT2, MT3), a circuit (PT) for processing the information item output by the buffer memories, and serializers (SE1, SE2, SE3) making it possible, for each colour, to put the data output by the processing circuit in series.

The signal output by each analog/digital converter is a succession of samples encoded over b bits and spaced apart in time by 25 ns. According to the preferred embodiment of the invention, the number b is equal to 12. However, the invention also relates to other types of encoding such as, for example, encoding over 10 bits.

According to the prefered embodiment of the invention, each buffer memory which receives the R, G or B signal output by an analog/digital converter consists of two subsets of N FIFO-type circuits. A first subset receives the even order samples and a second subset receives the odd order samples.

In the example chosen, where N=3, the first, second and third circuits of the first subset store, at the frequency 20.25 MHz, the even samples of the frames of successive ranks 1, 4, 7 etc., for the first circuit, of the frames of successive ranks 2, 5, 8, etc., for the second circuit, and of the frames of successive ranks 3, 6, 9, etc., for the third circuit.

Likewise, the first, second and third circuits of the second subset store, at the frequency 20.25 MHz, the odd samples of the frames of successive ranks 1, 4, 7 etc., for the first circuit, of the frames of successive ranks 2, 5, 8, etc., for the second circuit, and of the frames of successive ranks 3, 6, 9, etc., for the third circuit.

In the general case, the i-th circuit of each subset receives the samples, respectively or even or odd order, of the frames of successive ranks i, i+N, i+2N, etc. According to the preferred embodiment, the data are written to the FIFO memories at the sampling frequency Fe, and are read at the standard 13.5 MHz frequency.

When N=3, the signal output by the buffer memories MT1, MT2 and MT3 is respectively composed of a set of red colour signals R1, R2 and R3, of a set of green colour signals G1, G2 and G3 and of a set of a blue colour signals B1, B2, B3.

Advantageously, because reading is at the standard 13.5 MHz frequency, each of the sets of signals Ri, Gi, Bi (i=1, 2, 3) corresponds to the standard 50 Hz or 60 Hz frequency.

Figure 4:
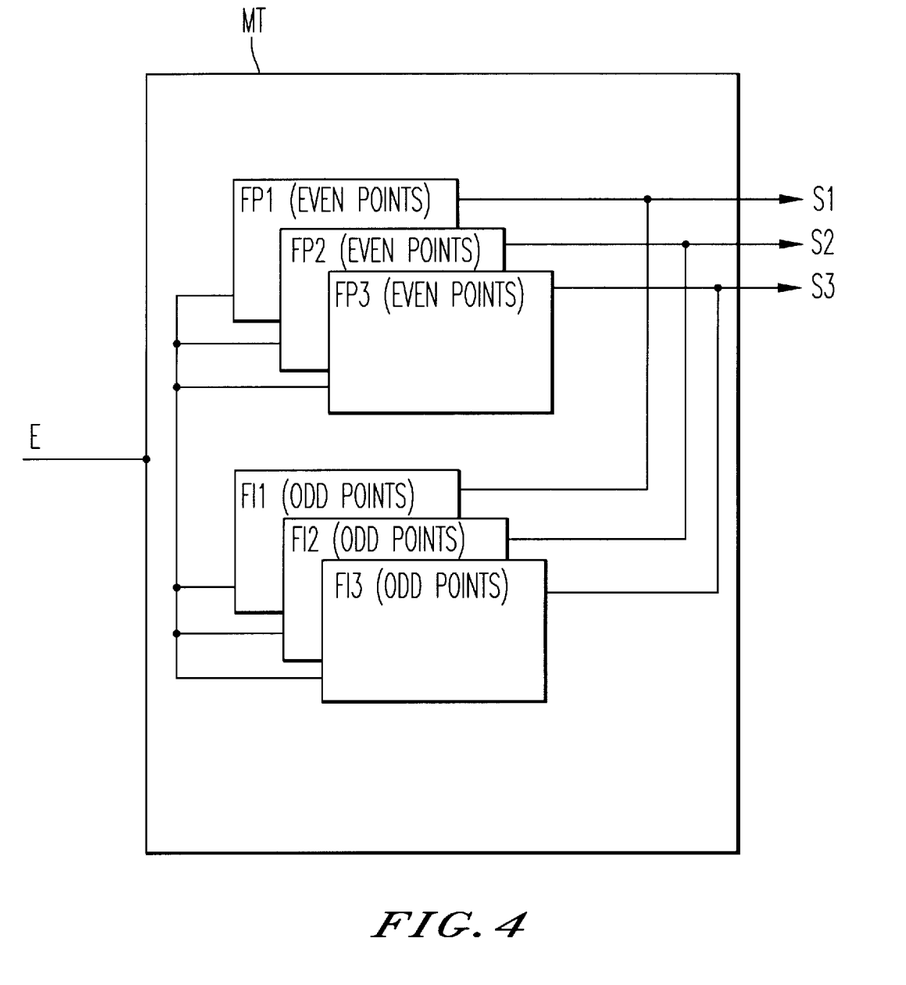
FIG. 4 represents a detail view of a first circuit represented in FIGS. 2 and 3.

For reasons of clarity, the content of the buffer memories is not represented in FIG. 2. Instead, it is represented in FIG. 4.

The signals Ri, Gi, Bi (i=1, 2, 3) are sent to a processing operator PT so that the usual operations such as, for example, white compression to restore contrast when close to saturation (commonly referred to "knee") or else rendering uniform the black levels and the white levels of the various colours red, green and blue (commonly referred to as "shading") are carried out. Most generally, the processing operator PT is a circuit making it possible to perform any processing function which proves to be useful on the colour data Ri, Gi, Bi (i=1, 2, 3).

Advantageously, the processing operator PT also makes it possible to convert the colour data R, G, B into luminance and chrominance data Y, CB, CR.

For reasons of clarity, the architecture of the processing circuit PT according to the invention does not appear in FIG. 2. This architecture is described in FIG. 5. The signals output by the operator PT are the three luminance components Y1, Y2, Y3, the three red colour difference chrominance components CR1, CR2, CR3 and the three blue colour difference chrominance components CB1, CB2, CB3. The three components Y1, CR1, CB1 are sent to a serializer SE1 so as to generate the usual series data stream CB1(1), Y1(1), CR1(1), Y1(2), CB1(3), Y1(3), CR1(3), Y1(4), CB1(5), Y1(5), CR1(5), etc., where the index (n) of the various components CBi, Yi, CRi represents the rank of a bit packet. The same is true for the three components Y2, CR2, CB2 sent to the serializer SE2, as well as for the three components Y3, CR3, CB3 sent to the serializer SE3. The data streams D1, D2, D3 output by the respective serializers SE1, SE2, SE3 are then sent to a device 120 for generating slow motion R. Slow-motion generation devices of this type are known per se. One example is a device such as the SUPER LSM developed by the company EVB BROADCAST EQUIPMENT.

Figure 3:
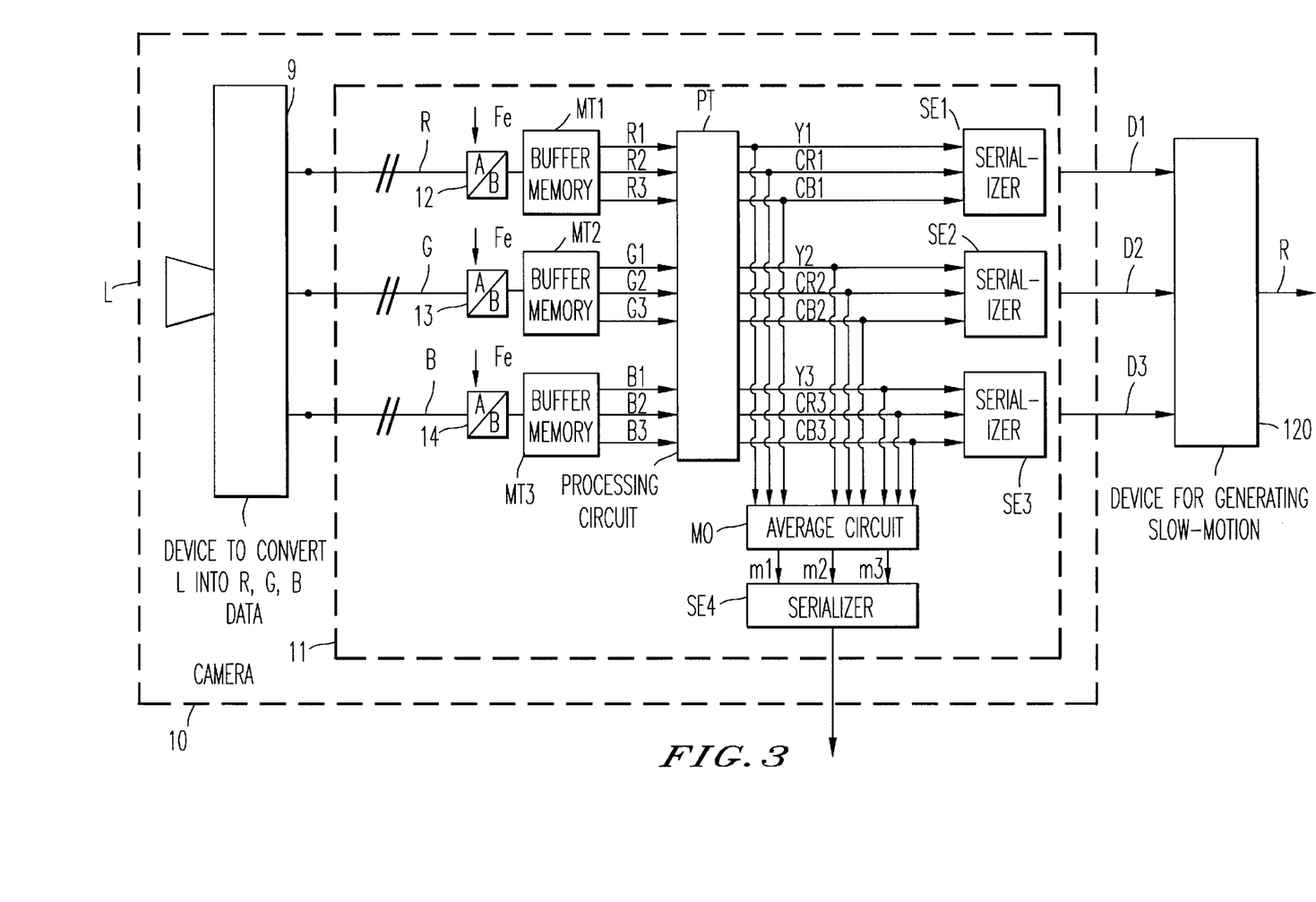
FIG. 3 represents an improvement of the device represented in FIG. 2.

FIG. 3 represents an improvement of the device represented in FIG. 2.

According to this improvement of the invention, the data making it possible to generate the slow-motion image R also make it possible to generate the image at normal speed.

Specifically, the luminance and chrominance data Yi, CRi, CBi (i=1, 2, 3) are then applied to a circuit MO whose function is to take the average of the various components. According to the preferred embodiment, the signal output by the circuit MO is composed of three separate signals:
a luminance signal m1 such as:

$$m1 = \frac{Y1(t1) + Y2(t2) + Y3}{3},$$

a red colour difference chrominance signal m2 such as:

$$m2 = \frac{CR1(t1) + CR2(t2) + CR3}{3},$$

a blue colour difference chrominance signal m3 such as:

$$m3 = \frac{CB1(t1) + CB2(t2) + CB3}{3},$$

where Y1(t1), CR1(t1) and CB1(t1) respectively represent the luminance, red colour difference and blue colour difference components Y1, CR1 and CB1 delayed by the time t1 corresponding to the passage of two successive high-frequency frames, and where Y2(t2), CR2(t2) and CB2(t2) respectively represent the luminance, red colour difference and blue colour difference components Y2, CR2 and CB2 delayed by the time t2 corresponding to the passage of one high-frequency frame. As mentioned above, the term high-frequency frame is intended to mean a frame whose frequency is equal to an integer multiple N of the standard 50 Hz or 60 Hz frequency. The signals Y1 and Y2 are thus time-shifted relative to the signal Y3, the signals CR1 and CR2 relative to the signal CR3 and the signal CB1 and CB2 relative to the signal CB3. The circuit MO comprises delay circuits making it possible to produce these time shifts.

The result of this is that the signals m1, m2 and m3 constituting the first frame at standard frequency, that is to say 50 Hz or 60 Hz, are respectively created from the luminance signal, from the red colour difference signal and the blue colour difference signal of two successive high-frequency frames of odd rank and of the high-frequency frame of even rank lying between the two successive frames of odd rank.

Likewise, the signals m1, m2 and m3 constituting the second frame at standard frequency are respectively created from the luminance signal, from the red colour difference signal and from the blue colour difference signal of two successive high-frequency frames of even rank and of the high-frequency frame of odd rank lying between the two successive frames of even rank.

Advantageously, this effect of averaging between even and odd frames allows an improvement in the rendering of the image at normal speed. A serializer SE4 receives the signals m1, m2, m3 at its input and delivers at its output the signal I making it possible to reproduce the image at normal speed.

According to a particular embodiment of the improvement of the invention, it is possible to weight the influence of the various values of each component Yi, CBi, CRi using coefficients αi, βi, γi when calculating the averages m1, m2, m3.

This gives:

$$m1 = \frac{\alpha 1 \times Y1(t1) + \alpha 2 \times Y2(t2) + \alpha 3 \times Y3}{3},$$

$$m2 = \frac{\beta 1 \times CR1(t1) + \beta 2 \times CR(t2) + \beta 3 \times CR3}{3},$$

$$m3 = \frac{\gamma 1 \times CB1(t1) + \gamma 2 \times CB2(t2) + \gamma 3 \times CB3}{3},$$

The coefficients αi, βi, γi may be identical or different depending on the weighting law which it is desired to establish.

FIG. 4 represents a detail view of a first circuit represented in FIGS. 2 and 3. This first circuit is a buffer memory circuit MT such as those referenced MT1, MT2 or MT3. The input signal E therefore generically represents the digitized R, G, B colour signals, whereas the output signals S1, S2, S3 respectively represent either the signals R1, R2, R3, when E=R, or the signals G1, G2, G3, when E=G, or the signals B1, B2, B3, when E=B.

As mentioned above, the input signal E consists of a succession of samples encoded over b bits. According to the illustrative embodiment chosen, each buffer memory consists of two subsets of three FIFO-type circuits. The first subset consists of the circuits FP1, FP2, FP3 which collect the samples of even order, and the second subset consists of the circuits FI1, FI2, FI3 which collect the samples of odd order.

According to the preferred embodiment chosen, the presence of two subsets of FIFO-type circuits requires the input frequency of the samples to be multiplexed. The result of this is each FIFO-type circuit (FP1, FP2, FP3, FI1, FI2, FI3) collects the samples at the frequency 20.25 MHz. Advantageously, sequential reading of the data avoids the use of an address counter for reading and writing.

According to another embodiment of the invention (not represented in the FIGS.), the memories used for reading the data Ri, Gi, Bi (i=1, 2, 3) are of the static RAM type. The sample access frequency is not then multiplexed and is equal to 40.5 MHz. The output frequency is equal to 13.5 MHz.

Figure 5:
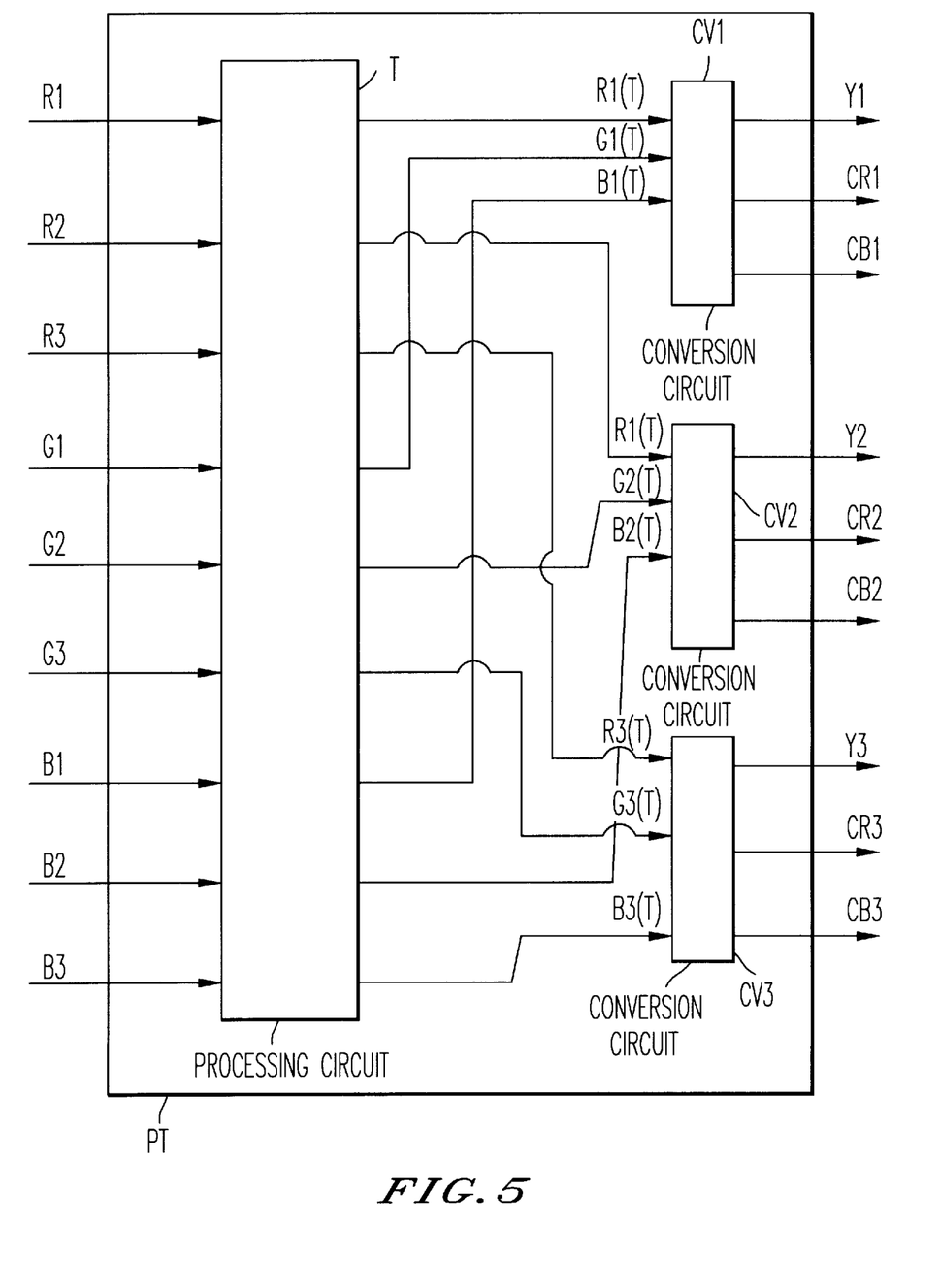
FIG. 5 represents a detail view of a second circuit represented in FIGS. 2 and 3.

FIG. 5 represents a detail view of a second circuit represented in FIG. 2. This second circuit is the processing circuit PT.

The processing circuit PT comprises a processing circuit T intended to perform the operations mentioned above such as, for example, white compression or making the black levels uniform and, more generally, any processing operation to which the colour data Ri, Gi, Bi (i=1, 2, 3) need to be subjected.

The result of this is that the circuit T generates the processed colour data Ri(T), Gi(T), Bi(T) from the initial colour data Ri, Gi, Bi.

The processed colour data Ri(T), Gi(T), and Bi(T) are converted by the respective circuits CVi into luminance and chrominance data Yi, CRi, CBi.

Figure 6:
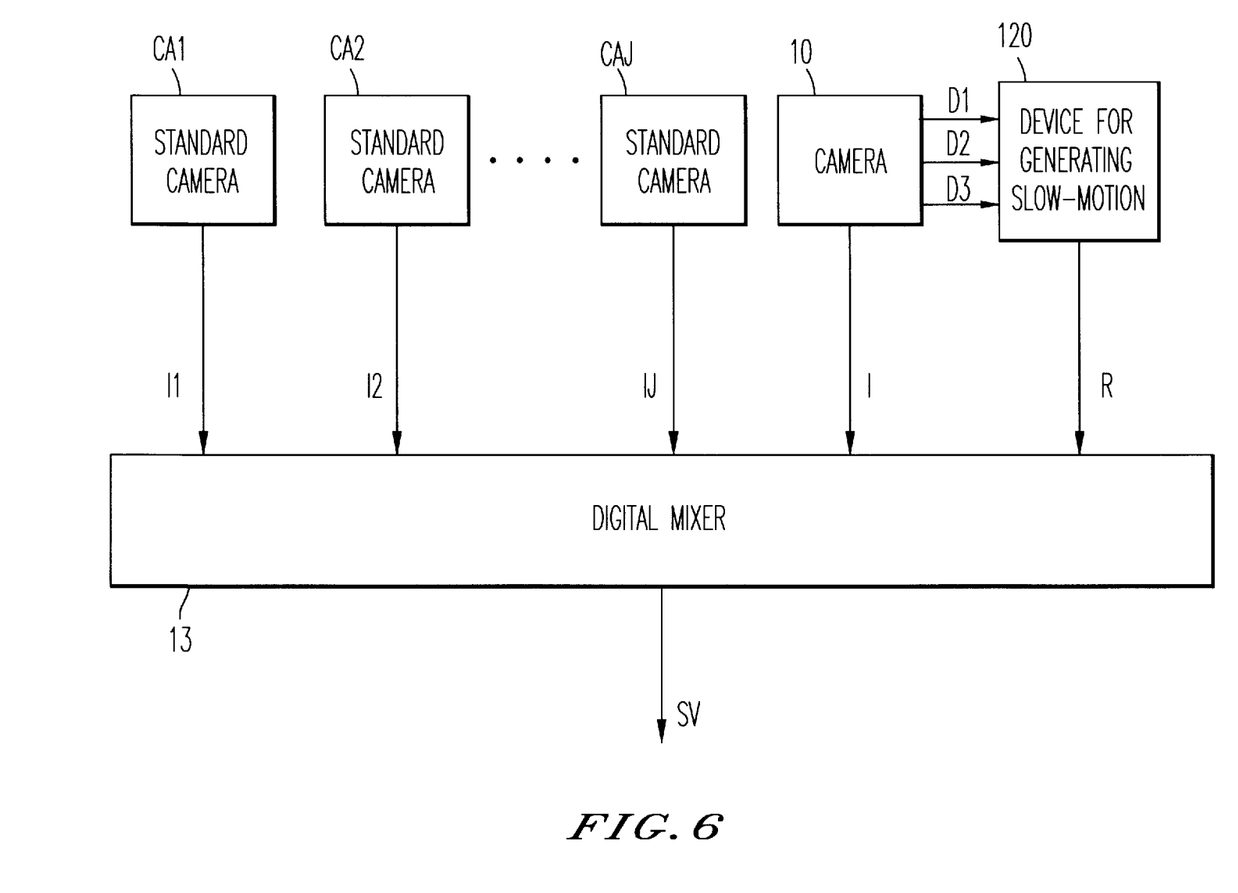
FIG. 6 represents an application using a slow-motion camera according to the invention.

FIG. 6 represents an application which uses a slow-motion camera according to the invention. According to this application, the signals I1, I2, . . . , Ij output by the respective standard cameras CA1, CA2, ..., CAj, as well as the signals I and R output by the device according to the invention, consisting of a camera 10 and a device 120, are sent to a digital mixer 13. The term standard camera is intended to mean a camera whose head and control unit operate at the standard 50 Hz or 60 Hz frame frequency.

The video signal SV output by the mixer 13 represents any one of signals I1, I2, ..., Ij, I or R. Advantageously, it is then possible simultaneously or successively to present the scene filmed by the camera 10 either at normal speed, that is to say using the signal I, or in slow motion, that is to say using the signal R.

The above description is given with reference to a colour video image comprising the various colour data R, G, B. It is clear to the person skilled in the art that the expression "luminance data" may substitute for the expression "colour data" if the invention is applied to the processing of a monochrome image rather than a colour image.

I claim:

1. Device for processing color data of a signal representing an image, characterized in that said device comprises means which, for each color information item, consist of an analog/digital converter and a buffer memory associated with said analog/digital converter, said analog/digital converter having an input and an output and said buffer memory having an input and an output, the output of said analog/digital converter being connected to the input of said associated buffer memory, each analog/digital converter allowing to sample the signal said each analog/digital converter receives at a frequency Fe equal to N times the standard sampling frequency of luminance signal so as to obtain samples, N being an integer greater than or equal to 1, each buffer memory allowing to write said samples output by said associated analog/digital converter at aid frequency Fe and to read said samples at the standard frequency of luminance signal, a processing circuit allowing to process the samples output by each buffer memory, said processing circuit comprising conversion circuits to convert the color data into luminance and chrominance data, and serializer circuits which collect signals output by the processing circuit and allow to generate signals intended to reconstruct the image with a slow-motion effect.

2. Device according to claim 1, characterized in that there are three buffer memories, each buffer memory comprising, in parallel, a first subset of N FIFO-type memories in parallel and a second subset of N FIFO-type memories in parallel, said first and second subsets respectively receiving the samples of odd order and the samples of even order output by the analog/digital converter associated with the buffer memory, so as to generate N color samples for each color, in that the processing circuit comprises a first circuit to process the 3×N color samples output by the three buffer memories, and N conversion circuits to convert the three color data items of each color sample into luminance data, blue color difference data and red color difference data, and in that there are N serializer circuits, each serializer circuit having an input to receive the three luminance and color difference components of the same color sample.

3. Device according to claim 1 or 2, further comprising means for generating a signal (I) to reconstruct the image at normal speed.

4. Device according to claim 3, characterized in that said means for generating a signal to reconstruct the image at normal speed is a circuit to delay each luminance, red color difference and blue color difference component and to take the average of the delayed components so that signals m1, m2, m3 output by said circuit are written:

$$m1 = \frac{Y1(t1) + Y2(t2) + Y3(t3) + \ldots + YN}{N},$$

$$m2 = \frac{CR1(t1) + CR2(t2) + CR3(t3) + \ldots + CRN}{N},$$

$$m3 = \frac{CB1(t1) + CB2(t2) + CB3(t3) + \ldots + CBN}{N},$$

where ti (i=1, 2, ..., N−1) is a delay to time-shift the components Yi, CRi and CBi relative to the respective components YN, CRN, CBN, and of a serializer which receives as input signals the signals m1, m2, m3 and delivers as output signal a signal allowing to reproduce the image at normal speed.

5. Device according to claim 3, characterized in that said means for generating a signal to reconstruct the image at normal speed is a circuit to delay each luminance, red color difference and blue color difference component and to take the average of the delayed components so that signals m1, m2, m3 output by said circuit are written:

$$m1 = \frac{\alpha 1 \times Y1(t1) + \alpha 2 \times Y2(t2) + \alpha 3 \times Y3(t3) + \ldots + \alpha N \times YN}{N},$$

$$m2 = \frac{\beta 1 \times CR1(t1) + \beta 2 \times CR2(t2) + \beta 3 \times CR3(t3) + \ldots + \beta N \times CRN}{N},$$

$$m3 = \frac{\gamma 1 \times CB1(t1) + \gamma 2 \times CB2(t2) + \gamma 3 \times CB3(t3) + \ldots + \gamma N \times CBN}{N},$$

where ti (i=1, 2, ..., N−1) is a delay making it possible to time-shift the components Yi, CRi and CBi relative to the respective components YN, CRN and CBN and where $\alpha i$, $\beta i$ and $\gamma i$ (i=1, 2, ..., N) are weighting coefficients, and of a serializer which receives as input signals the signals m1, m2, m3 and delivers as output signal a signal allowing to reproduce the image at normal speed.

6. Video camera comprising means to convert a luminous image into color data and a device for processing said color data, characterized in that the processing device is a device according to claim 1.

7. System to generate a signal representing a slow-motion image, characterized in that said system comprises a camera according to claim 6 and a device to generate the signal representing the slow-motion image from the signals output by the camera.

8. Video camera comprising means to convert an image into color data and a device for processing the color data, characterized in that the processing device comprises first means for generating signals to form the image with a slow-motion effect and second means for generating a signal to form the same image at normal speed.

* * * * *